United States Patent Office 2,886,485
Patented May 12, 1959

2,886,485

6-BROMOPIPERONYL AND 6-CHLOROPIPERONYL ESTERS OF CHRYSANTHEMUMIC ACID AS INSECTICIDES

William F. Barthel, Catonsville, Md., Benjamin H. Alexander, Washington, D.C., James B. Gahan, Orlando, Fla., and Price G. Piquett, Ellicott City, Md.

No Drawing. Application September 12, 1957
Serial No. 683,669

2 Claims. (Cl. 167—33)

(Granted under Title 35, U.S. Code (1952), sec. 266)

A non-exclusive, irrevocable, royalty-free license in the invention herein described, throughout the world for all purposes of the United States Government, with the power to grant sublicenses for such purposes, is hereby granted to the Government of the United States of America.

The patent rights for the United States in any invention in the patent to be granted on this application are dedicated to the public.

This application is a continuation-in-part of Serial No. 633,506, filed January 10, 1957, now abandoned.

This invention relates to the 6-bromopiperonyl and 6-chloropiperonyl esters of chrysanthemumic acid and their use as insecticides.

The esters may be represented by the formula

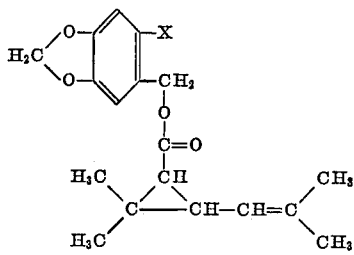

in which X is either a bromine or a chlorine atom.

The esters possess insecticidal properties and may be used to combat flies, mosquitoes, lice, and other insect pests by contacting the insects with the esters. They may be dispensed by hydrocarbon or mineral type solvents, e.g., odorless kerosene and naphtha. For application as a fine mist they may be dissolved in a liquefied gas, such as dichlorodifluoromethane or methyl chloride, in the usual type of aerosol bomb. For application in the dry state, they may be incorporated with talc, ground walnut hulls, pyrophyllite, or with other solid powdered carriers.

For the control of certain types of insects, it may be advantageous to admix the esters of this invention with known insecticides such as derris, nicotine, pyrethrum, allethrin, DDT, and so forth.

The esters may be prepared by reacting 6-bromopiperonyl alcohol, or 6-chloropiperonyl alcohol with commercial dl-cis-trans-chrysanthemumoyl chloride in the presence of a tertiary amine. It is usually preferred to carry out the reaction in an inert solvent so as to get intimate contact of the reactants.

The following example demonstrates the preparation of the esters in detail.

Twenty-four grams of 6-bromopiperonyl alcohol was mixed with 10 grams of dry distilled pyridine and 75 ml. of dry low-boiling petroleum ether (B.P., 30°–60° C.). To this was added slowly with shaking to mix the undissolved alcohol, 20 grams of dl-cis-trans-chrysanthemumic acid chloride, dissolved in 75 ml. of dry petroleum ether (B.P. 30°–60° C.).

After the mixture had stood overnight, 100 ml. of ethyl ether was added and the ether solution was extracted successively with water, 20 ml. of 10% sodium carbonate solution twice, 20 ml. of 5% hydrochloric acid, 20 ml. of water, and 50 ml. of saturated sodium chloride solution. The ether solution was dried over sodium sulfate, the ether removed on a steam bath, and the residue distilled under high vacuum. Twenty-seven grams of the 6-bromopiperonyl ester of chrysanthemumic acid was obtained.

In a like manner 19 grams of 6-chloropiperonyl alcohol was rected with 20 grams of dl-cis-trans-chrysanthemumic acid chloride to give 25 grams of the 6-chloropiperonyl ester of chrysanthemumic acid.

Both esters, which are water-white liquids when pure, are oily, odorless and completely soluble in deodorized kerosene. Table I gives some data on the compounds:

Table I

| Compound | Boiling Point, °C./mm. Hg. | Refractive Index, ($n_D^{25}$) |
|---|---|---|
| 6-Bromopiperonyl chrysanthemumate | 173/0.6 | 1.5455 |
| 6-Chloropiperonyl chrysanthemumate | 184/0.7 | 1.5383 |

Since the discovery of such powerful insecticides as DDT and certain phosphorus-containing pesticides, tremendous strides have been taken in controlling mosquitoes and similar pests throughout the world. In recent years, however, it has been noticed that mosquito larvae are not controlled with the usual and economic dosage of DDT and similar materials because of the resistance developed by the insects to the toxicant. The present invention then becomes timely in that it provides a new and highly effective weapon against the insect pests such as mosquitoes.

The esters are unexpectedly highly toxic to mosquito larvae. In ordinary screening work materials are considered promising if they cause 100% kill of mosquito larvae at 10 parts per million. For a material to be of economic importance it must be toxic at much lower concentrations and because of these exacting requirements, relatively few materials have become economically important. For example, out of 12,400 compounds tested at the Orlando laboratories of the Department of Agriculture only 14 were toxic at 0.01 part per million to the southern house mosquito larvae and only 6 were toxic at 0.01 part per million to the yellow-fever mosquito larvae, both insects being serious pests in many parts of the world. Most of the compounds that are effective mosquito larvicides are phosphorus compounds, but these are usually highly toxic to mammals. The esters of this invention are unique in that they belong to a class of compounds that are practically non-toxic to mammals and yet are highly effective mosquito larvicides. The effectiveness of these compounds against the mosquito larvae of *Aedes aegypti* is illustrated in Table II:

Table II

| Compound | Percent Kill in 48 Hours | | | |
|---|---|---|---|---|
| | 0.5 p.p.m. | 0.025 p.p.m. | 0.01 p.p.m. | 0.005 p.p.m. |
| 6-Bromopiperonlyl chrysanthemumate | 100 | 90 | | |
| 6-Chloropiperonyl chrysanthemumate | 100 | 100 | 86 | 64 |

In addition to being highly toxic to mosquito larvae, these compounds, especially the 6-chloropiperonyl chrysanthemumate, are also toxic to house flies, *Musca dom-*

*estica* (L.). Results of tests by the Campbell turntable method are given in Table III:

Table III

|  | Concentration, grams/100 ml. in kerosene | Percent Kill in 24 Hours |
|---|---|---|
| 6-Chloropiperonyl chrysanthemumate | 0.7 | 99 |
| Do | 0.4 | 97 |
| Pyrethrins (Standard) | 0.4 | 79 |
| Do | 0.2 | 58 |

We claim:
1. An insecticide containing as its essential active ingredient

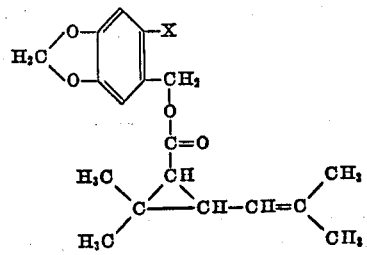

in which X is selected from the atoms consisting of bromine and chlorine.

2. A method of destroying insects comprising contacting them with

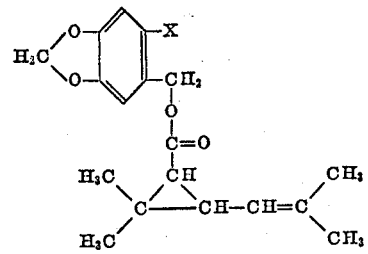

in which X is selected from the atoms consisting of bromine and chlorine.

References Cited in the file of this patent
UNITED STATES PATENTS
2,458,656    Synerholm _____ Jan. 11, 1949

OTHER REFERENCES

Naik et al.: J. Chem. Soc., 1938, pp. 1780–1783.
J. Econ. Ent., vol. 40, No. 5, pp. 736–741 (1947).
J. Econ. Ent., vol. 47, No. 3, pp 501–505 (1954).
J. Am. Chem. Soc., 75, pp. 4287–89 (1943).